(12) United States Patent
Bayesteh et al.

(10) Patent No.: US 12,284,655 B2
(45) Date of Patent: Apr. 22, 2025

(54) WAVEFORM ADAPTATION FOR INTEGRATED COMMUNICATIONS AND SENSING

(71) Applicants: Alireza Bayesteh, Ottawa (CA); Navid Tadayon, Kanata (CA); Jianglei Ma, Ottawa (CA); Wen Tong, Ottawa (CA)

(72) Inventors: Alireza Bayesteh, Ottawa (CA); Navid Tadayon, Kanata (CA); Jianglei Ma, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 839 days.

(21) Appl. No.: 17/089,123

(22) Filed: Nov. 4, 2020

(65) Prior Publication Data

US 2022/0141804 A1 May 5, 2022

(51) Int. Cl.
  *H04W 72/04* (2023.01)
  *H04W 8/24* (2009.01)
  *H04W 72/23* (2023.01)

(52) U.S. Cl.
  CPC ............. *H04W 72/23* (2023.01); *H04W 8/24* (2013.01); *H04W 72/04* (2013.01)

(58) Field of Classification Search
  CPC ............................... H04W 72/23; H04W 8/24
  USPC ......................................................... 370/329
  See application file for complete search history.

(56) References Cited

U.S. PATENT DOCUMENTS

| | | | |
|---|---|---|---|
| 7,269,097 B1 | 9/2007 | Steinbrecher | |
| 9,692,550 B2 * | 6/2017 | Bayesteh | H04W 72/02 |
| 9,955,375 B2 | 4/2018 | Chincholi et al. | |
| 2003/0083081 A1 * | 5/2003 | Sanders, III | H04M 3/2263 455/466 |
| 2015/0160066 A1 | 6/2015 | Sai | |
| 2016/0036608 A1 * | 2/2016 | Lee | H04L 12/40 375/295 |
| 2018/0284265 A1 | 10/2018 | Bilik et al. | |
| 2019/0318206 A1 | 10/2019 | Smith et al. | |
| 2020/0225317 A1 * | 7/2020 | Chen | G01S 7/417 |
| 2020/0314607 A1 | 10/2020 | Hwang et al. | |
| 2021/0185672 A1 * | 6/2021 | Wang | H04L 5/0007 |
| 2022/0109951 A1 * | 4/2022 | Tadayon | H04B 1/69 |
| 2023/0224696 A1 * | 7/2023 | Li | H04W 8/24 370/252 |

FOREIGN PATENT DOCUMENTS

| | | |
|---|---|---|
| WO | 2021047284 A1 | 3/2021 |
| WO | 2022001560 A1 | 1/2022 |

OTHER PUBLICATIONS

Framework for a Perceptive Mobile Network using Joint Communication and Radar Sensing, IEEE, 14 pages (Year: 2019).*

* cited by examiner

*Primary Examiner* — Christopher M Crutchfield
*Assistant Examiner* — Jean F Voltaire

(57) ABSTRACT

Some embodiments of the present disclosure relate to the selection of a waveform for an integrated communications and sensing (ICS) signal, where the waveform is suitable for both communication applications and sensing applications. In view of the sensing applications, the waveform selection can be, at least in part, adapted based on capabilities of hardware of nodes involved in the sensing applications. In view of the communication applications, the waveform selection can be, at least in part, adapted based on the extent to which data is to be embedded.

12 Claims, 12 Drawing Sheets

| ICS WAVEFORM | | ICS CONFIGURATION - STRATEGY | | | ICS CAPABILITY | | | |
|---|---|---|---|---|---|---|---|---|
| | | SENSING-ONLY (DED. SENSING) | DEDICATED SENSING + BROADCAST DATA | COMMON SENSING + UNICAST DATA | RF | DUPLEX-ING | PROCESS-ING | OBL |
| FMCW | | ✓ | X | X | ✓ | ✓ | ✓ | OK |
| MULTI-CARRIER WAVEFORM | CP-OFDM | X | X | ✓ | REQ HI | REQUIRE FD | ✓ | OK |
| | OFDM (NO CP) | ✓ | ✓ | X | REQ HI PA CAP | ✓ | REQUIRE HIGH | OK |
| | FBMC | X | ✓ | X | ✓ | ✓ | REQUIRE HIGH | ✓ |
| SINGLE-CARRIER WAVEFORM (UWB PULSE RADAR) | | X | ✓ | X | ✓ | ✓ | ✓ | X |

FIG. 5

WAVEFORM ADAPTATION FOR INTEGRATED COMMUNICATIONS AND SENSING

TECHNICAL FIELD

The present disclosure relates, generally, to integrated communications and sensing in wireless networks and, in particular embodiments, to waveform adaptation for such integrated communications and sensing.

BACKGROUND

In the future, it is expected that wireless communication networks will include diverse nodes with diverse capabilities. These nodes will likely include both communications capabilities and sensing capabilities such that the entire network may be considered to be an integrated communications and sensing (ICS) network. 5G New Radio (NR) is a radio access technology (RAT) developed by the 3rd Generation Partnership Project (3GPP) for 5G (fifth generation) mobile networks. Many waveforms were considered when 5G NR was being standardized. Eventually, the standardization body settled upon Cyclic-Prefix Orthogonal Frequency Division Multiplexing (CP-OFDM).

CP-OFDM provides a scalable and low-complexity waveform solution with acceptable performance for the task of communications. However, CP-OFDM may be shown to be unsuitable for sensing applications, especially if hardware imperfections are taken into consideration.

On the other hand, for the task of sensing, there exist solutions based on Radio Azimuth Direction and Ranging (RADAR). These solutions use a frequency modulated continuous wave (FMCW) waveform. This waveform is also known as a "chirp." Notably, the chirp waveform is known to be unsuitable for communication applications. The term RADAR need not always be expressed in all caps; "RADAR," "Radar" and "radar" are equally valid.

SUMMARY

Aspects of the present application relate to the selection of a waveform for an ICS signal, where the waveform is suitable for both communication applications and sensing applications. In view of the sensing applications, the waveform selection can be, at least in part, adapted based on capabilities of hardware of nodes involved in the sensing applications as well as defined sensing key performance indicators. In view of the communication applications, the waveform selection can be, at least in part, adapted based on the extent to which data is to be embedded.

Through appropriate selection of a waveform for an ICS signal, and by adapting the waveform for the ICS signal based on the hardware capabilities of various nodes, more nodes can be involved in the sensing applications and it may be illustrated that improvements in sensing coverage and diversity may be realized along with improvements in sensing performance. By adapting the waveform based on the extent to which data is to be embedded, it may be illustrated that improvements in performance may be realized for the communication applications along with a reduction in overhead.

According to a first aspect of the present disclosure, there is provided a method. The method includes communicating, between a first communication device and a second communication device, first signaling for indicating an integrated communication and sensing (ICS) configuration. The ICS configuration includes at least one of: a sensing-only ICS configuration, a sensing and communications ICS configuration, or a communications-only ICS configuration. The method further includes communicating, between the first communication device and the second communication device, second signaling for indicating a selected waveform. The selected waveform is selected, at least in part, on the indicated ICS configuration. The method further includes transmitting, by the first communication device, a signal according to the selected waveform.

In an embodiment of the first aspect, the first communication device is a base station and the second communication device is a user equipment (UE). Communicating the first signaling involves the base station transmitting the first signaling to the UE. Communicating the second signaling involves the base station transmitting the second signaling to the UE. The method further includes receiving, by the base station, a reflection of the transmitted signal.

In a different embodiment of the first aspect, the first communication device is a base station and the second communication device is a user equipment (UE). Communicating the first signaling involves the base station transmitting the first signaling to the UE. Communicating the second signaling involves the base station transmitting the second signaling to the UE, The method further includes receiving, by the UE, a reflection of the transmitted signal.

In an embodiment of the first aspect, or further to any of the previous embodiments, the method further includes communicating a sensing capability report between the first communication device and the second communication device. The sensing capability report includes at least one of: an indication of a processing capability, an indication of radio frequency capability, or an indication of duplexing capability. In a further embodiment of the previous embodiment, the selected waveform is further selected, at least in part, on the sensing capability report.

According to a second aspect of the present disclosure, there is provided a method. The method includes communicating, between a first communication device and a second communication device, first signaling for indicating an integrated communication and sensing (ICS) configuration. The ICS configuration includes at least one of: a sensing-only ICS configuration, a sensing and communications ICS configuration, or a communications-only ICS configuration. The method further includes communicating, between the first communication device and the second communication device, second signaling for indicating a selected waveform. The selected waveform is selected, at least in part, on the indicated ICS configuration. The method further includes receiving, by the first communication device, a signal according to the selected waveform.

In an embodiment of the first aspect, the first communication device is a user equipment (UE) and the second communication device is a base station. Communicating the first signaling involves the UE receiving the first signaling from the base station. Communicating the second signaling involves the UE receiving the second signaling from the base station. The method further comprises receiving, by the base station, a reflection of the signal received by the UE.

In a different embodiment of the first aspect, the first communication device is a user equipment (UE) and the second communication device is a base station. Communicating the first signaling involves the UE receiving the first signaling from the base station. Communicating the second signaling involves the UE receiving the second signaling from the base station. The signal received by the UE is a reflection of a transmitted signal.

In an embodiment of the first aspect, or further to any of the previous embodiments, the method further includes communicating a sensing capability report between the first communication device and the second communication device. The sensing capability report includes at least one of: an indication of a processing capability, an indication of radio frequency capability, or an indication of duplexing capability. In a further embodiment of the previous embodiment, the selected waveform is further selected, at least in part, on the sensing capability report.

According to another aspect of the present disclosure, there is provided a device. The device includes a memory storing instructions, a receiver, a transmitter and a processor. The processor is configured, by executing the instructions, to perform a method in accordance with any of the previous aspects or embodiments.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 5 illustrates, in a table, examples of selection assistance data to assist in the making of a selection of a waveform for an ICS signal according to aspects of the present application;

DETAILED DESCRIPTION OF ILLUSTRATIVE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
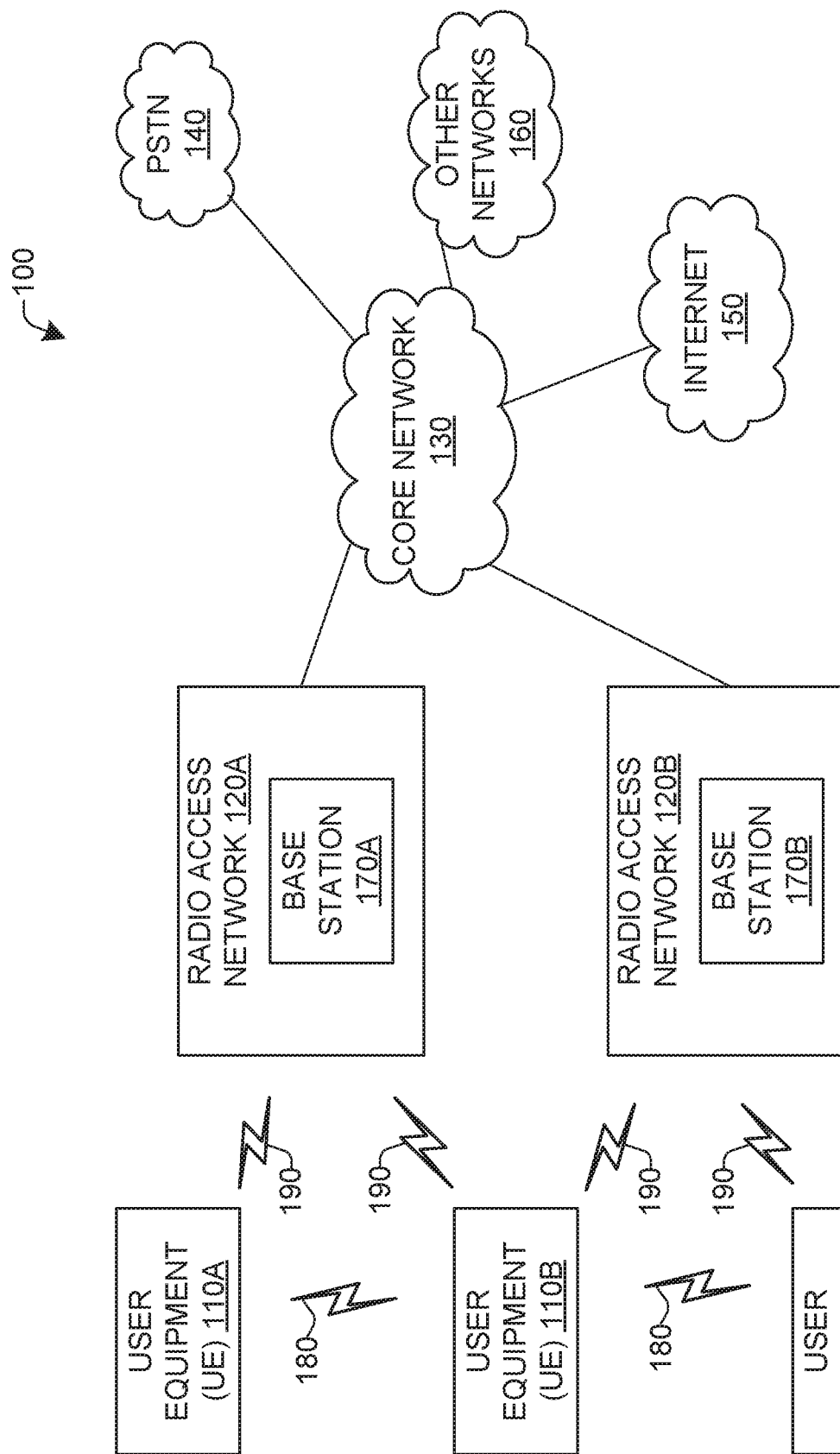
FIG. 1 is a schematic diagram of a communication system in which embodiments of the disclosure may occur, the communication system includes an example user equipment and an example base station.

FIG. 1 illustrates, in a schematic diagram, an example communication system 100. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate efficiently by sharing resources, such as bandwidth.

In this example, the communication system 100 includes a first user equipment (UE) 110A, a second UE 110B and a third UE 110C (individually or collectively 110), a first radio access network (RAN) 120A and a second RAN 120B (individually or collectively 120), a core network 130, a public switched telephone network (PSTN) 140, the Internet 150 and other networks 160. Although certain numbers of these components or elements are shown in FIG. 1, any reasonable number of these components or elements may be included in the communication system 100.

The UEs 110 are configured to operate, communicate, or both, in the communication system 100. For example, the UEs 110 are configured to transmit, receive, or both via wireless communication channels. Each UE 110 represents any suitable end user device for wireless operation and may include such devices (or may be referred to) as a wireless transmit/receive unit (WTRU), a mobile station, a mobile subscriber unit, a cellular telephone, a station (STA), a machine-type communication device (MTC), an Internet of Things (IoT) device, a personal digital assistant (PDA), a smartphone, a laptop, a computer, a touchpad, a wireless sensor or a consumer electronics device.

In FIG. 1, the first RAN 120A includes a first base station 170A and the second RAN includes a second base station 170B (individually or collectively 170). The base station 170 may also be called an anchor or a transmit point (TP). Each base station 170 is configured to wirelessly interface with one or more of the UEs 110 to enable access to any other base station 170, the core network 130, the PSTN 140, the internet 150 and/or the other networks 160. For example, the base stations 170 may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP) or a wireless router. Any UE 110 may alternatively or additionally be configured to interface, access or communicate with any other base station 170, the internet 150, the core network 130, the PSTN 140, the other networks 160 or any combination of the preceding. The communication system 100 may include RANs, such as the RAN 120B, wherein the corresponding base station 170B accesses the core network 130 via the internet 150, as shown.

The UEs 110 and the base stations 170 are examples of communication equipment that can be configured to implement some or all of the functionality and/or embodiments described herein. In the embodiment shown in FIG. 1, the first base station 170A forms part of the first RAN 120A, which may include other base stations (not shown), base station controller(s) (BSC, not shown), radio network controller(s) (RNC, not shown), relay nodes (not shown), elements (not shown) and/or devices (not shown). Any base station 170 may be a single element, as shown, or multiple elements, distributed in the corresponding RAN 120, or otherwise. Also, the second base station 170B forms part of the second RAN 120B, which may include other base stations, elements and/or devices. Each base station 170 transmits and/or receives wireless signals within a particular geographic region or area, sometimes referred to as a "cell" or "coverage area." A cell may be further divided into cell sectors and a base station 170 may, for example, employ multiple transceivers to provide service to multiple sectors.

In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The base stations 170 communicate with one or more of the UEs 110 over one or more air interfaces 190 using wireless communication links, e.g., radio frequency (RF) wireless communication links, microwave wireless communication links, infrared (IR) wireless communication links, visible light (VL) communications links, etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), space division multiple access (SDMA), orthogonal FDMA (OFDMA) or single-carrier FDMA (SC-FDMA) in the air interfaces 190.

A base station 170 may implement Universal Mobile Telecommunication System (UMTS) Terrestrial Radio Access (UTRA) to establish the air interface 190 using wideband CDMA (WCDMA). In doing so, the base station 170 may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170 may establish the air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE and GERAN. Of course, other multiple access schemes and wireless protocols may be utilized.

The RANs 120 are in communication with the core network 130 to provide the UEs 110 with various services such as voice communication services, data communication services and other communication services. The RANs 120 and/or the core network 130 may be in direct or indirect communication with one or more other RANs (not shown), which may or may not be directly served by the core network 130 and may or may not employ the same radio access technology as the first RAN 120A, the second RAN 120B or both. The core network 130 may also serve as a gateway access between (i) the RANs 120 or the UEs 110 or both, and (ii) other networks (such as the PSTN 140, the Internet 150 and the other networks 160).

The UEs 110 may communicate with one another over one or more sidelink (SL) air interfaces 180 using wireless communication links, e.g., radio frequency (RF) wireless communication links, microwave wireless communication links, infrared (IR) wireless communication links, visible light (VL) communications links, etc. The SL air interfaces 180 may utilize any suitable radio access technology and may be substantially similar to the air interfaces 190 over which the UEs 110 communicate with one or more of the base stations 170 or they may be substantially different. For example, the communication system 100 may implement one or more channel access methods, such as CDMA, TDMA, FDMA, SDMA, OFDMA or SC-FDMA in the SL air interfaces 180. In some embodiments, the SL air interfaces 180 may be, at least in part, implemented over unlicensed spectrum.

Some or all of the UEs 110 may include functionality for communicating with different wireless networks over different wireless links using different wireless technologies and/or protocols. Instead of wireless communication (or in addition thereto), the UEs 110 may communicate via wired communication channels to a service provider or a switch (not shown) and to the Internet 150. The PSTN 140 may include circuit switched telephone networks for providing plain old telephone service (POTS). The Internet 150 may include a network of computers and subnets (intranets) or both and incorporate protocols, such as internet protocol (IP), transmission control protocol (TCP) and user datagram protocol (UDP). The UEs 110 may be multimode devices capable of operation according to multiple radio access technologies and incorporate multiple transceivers necessary to support multiple radio access technologies.

Figure 2:
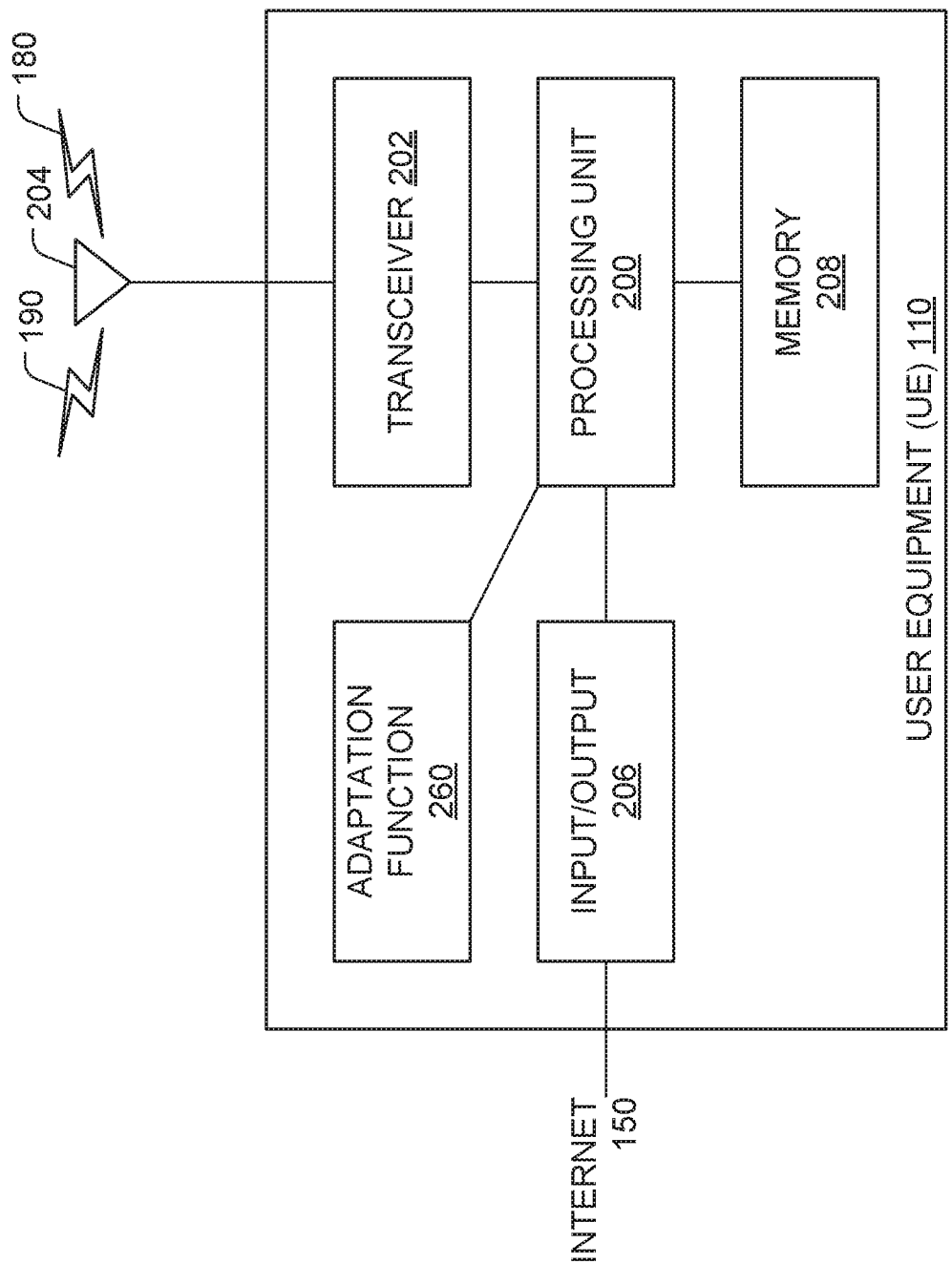
FIG. 2 illustrates, in a block diagram, an example user equipment of the communication system of FIG. 1, in accordance with aspects of the present application.
Figure 3:
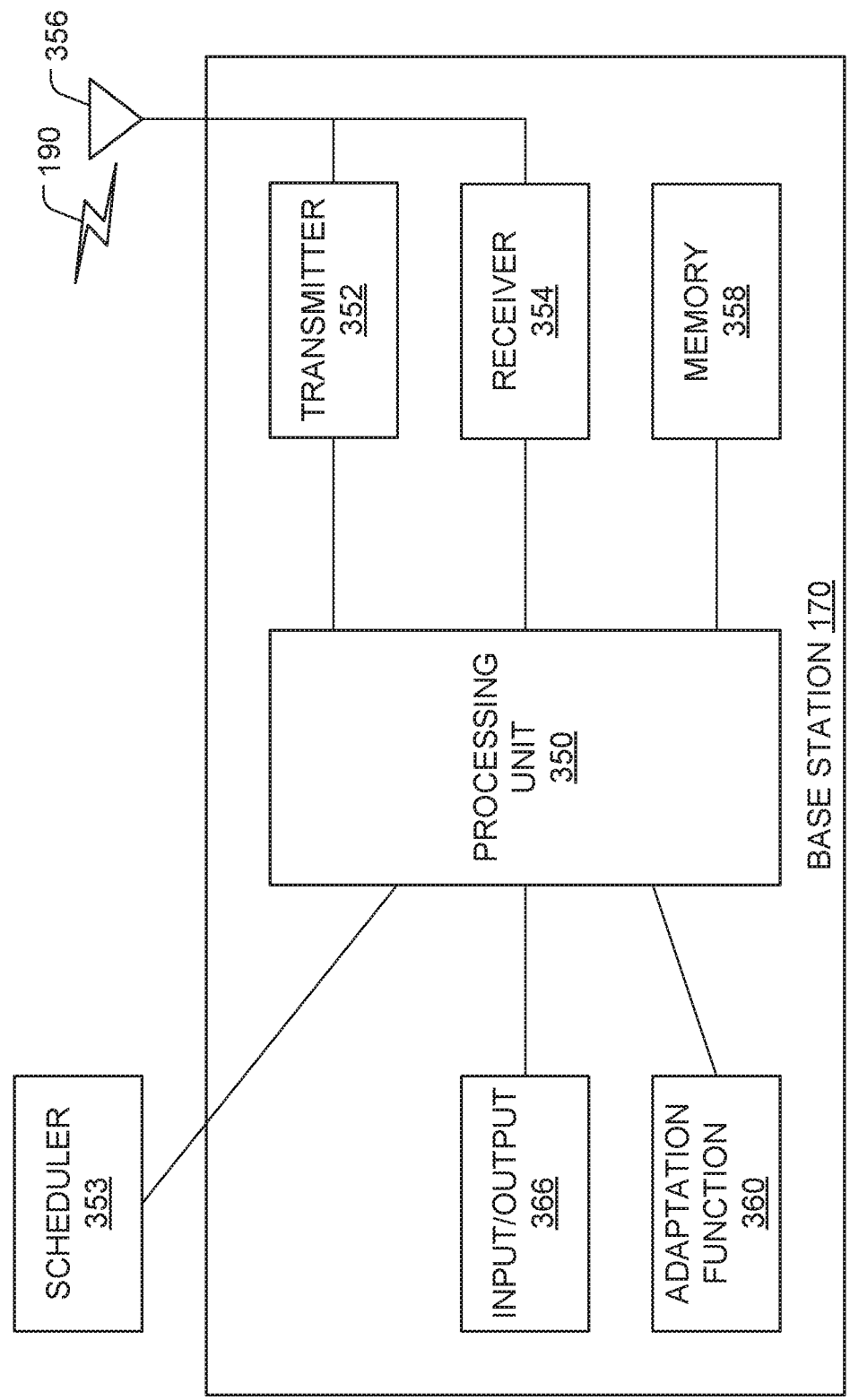
FIG. 3 illustrates, in a block diagram, an example base station of the communication system of FIG. 1, in accordance with aspects of the present application.

FIGS. 2 and 3 illustrate example devices that may implement the methods and teachings according to this disclosure. In particular, FIG. 2 illustrates an example UE 110 and FIG. 3 illustrates an example base station 170. These components could be used in the communication system 100 of FIG. 1 or in any other suitable system.

As shown in FIG. 2, the UE 110 includes at least one UE processing unit 200. The UE processing unit 200 implements various processing operations of the UE 110. For example, the UE processing unit 200 could perform signal coding, data processing, power control, input/output processing, or any other functionality enabling the UE 110 to operate in the communication system 100. The UE processing unit 200 may also be configured to implement some or all of the functionality and/or embodiments described in more detail above. Each UE processing unit 200 includes any suitable processing or computing device configured to perform one or more operations. Each UE processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the UE 110. One or multiple antennas 204 could be used in the ED 110. Although shown as a single functional unit, a transceiver 202 could also be implemented using at least one transmitter and at least one separate receiver.

The UE 110 further includes one or more input/output devices 206 or interfaces (such as a wired interface to the Internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the UE 110 includes at least one UE memory 208. The UE memory 208 stores instructions and data used, generated, or collected by the ED 110. For example, the UE memory 208 could store software instructions or modules configured to implement some or all of the functionality and/or embodiments described above and that are executed by the UE processing unit(s) 200. Each UE memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

FIG. 2 further illustrates an optional component of the UE 110, that is, a UE adaptation function 260 configured for carrying out aspects of the present application. The UE adaptation function 260 may be implemented in hardware or implemented as a software module that is executed by the UE processing unit 200.

As shown in FIG. 3, the base station 170 includes at least one BS processing unit 350, at least one transmitter 352, at least one receiver 354, one or more antennas 356, at least one memory 358, and one or more input/output devices or interfaces 366. A transceiver, not shown, may be used instead of the transmitter 352 and receiver 354. A scheduler 353 may be coupled to the BS processing unit 350. The scheduler 353 may be included within or operated separately from the base station 170. The BS processing unit 350 implements various processing operations of the base station 170, such as signal coding, data processing, power control, input/output processing, or any other functionality. The BS processing unit 350 can also be configured to implement some or all of the functionality and/or embodiments described in more detail above. Each BS processing unit 350 includes any suitable processing or computing device configured to perform one or more operations. Each BS processing unit 350 could, for example, include a microprocessor, microcontroller, digital signal processor, field programmable gate array, or application specific integrated circuit.

Each transmitter 352 includes any suitable structure for generating signals for wireless or wired transmission to one or more UEs or other devices. Each receiver 354 includes any suitable structure for processing signals received wirelessly or by wire from one or more UEs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the UE 110. The memory 358 stores instructions and data used, generated, or collected by the base station 170. For example, the memory 358 could store software instructions or modules configured to implement some or all of the functionality and/or embodiments described above and that are executed by the BS processing unit(s) 350.

Each input/output device 366 permits interaction with a user or other devices in the network. Each input/output device 366 includes any suitable structure for providing information to or receiving/providing information from a user, including network interface communications.

FIG. 3 further illustrates an optional component of the BS 170, that is, an BS adaptation function 360 configured for carrying out aspects of the present application. The BS adaptation function 360 may be implemented in hardware or implemented as a software module that is executed by the BS processing unit 350.

For an ICS network, signals suitable for both communication applications and sensing applications are desired.

In overview, the UE 110 transmits, to the BS 170, a capability report including an indication of the capabilities of the UE 110. The capability report may include a sensing capability report. Responsively, the BS 170 may select a waveform configuration and transmit, to the UE 110, an indication of the selected waveform configuration. Subsequently, one of the UE 110 or the BS 170 (whichever one is the so-called "sensing node," wherein the sensing node is the node that is involved in the sensing process, either by transmitting a sensing signal or by receiving reflections of a sensing signal) selects a waveform based on the capability report and the selected waveform configuration. The sensing node then transmits an indication of the selected waveform to the node that is not the sensing node. In some embodiments, wherein both the UE 110 and the BS 170 are sensing nodes, the BS 170 may perform waveform selection. In some other embodiments, the BS 170 may select the waveform even if it is not the sensing node.

Figure 4:
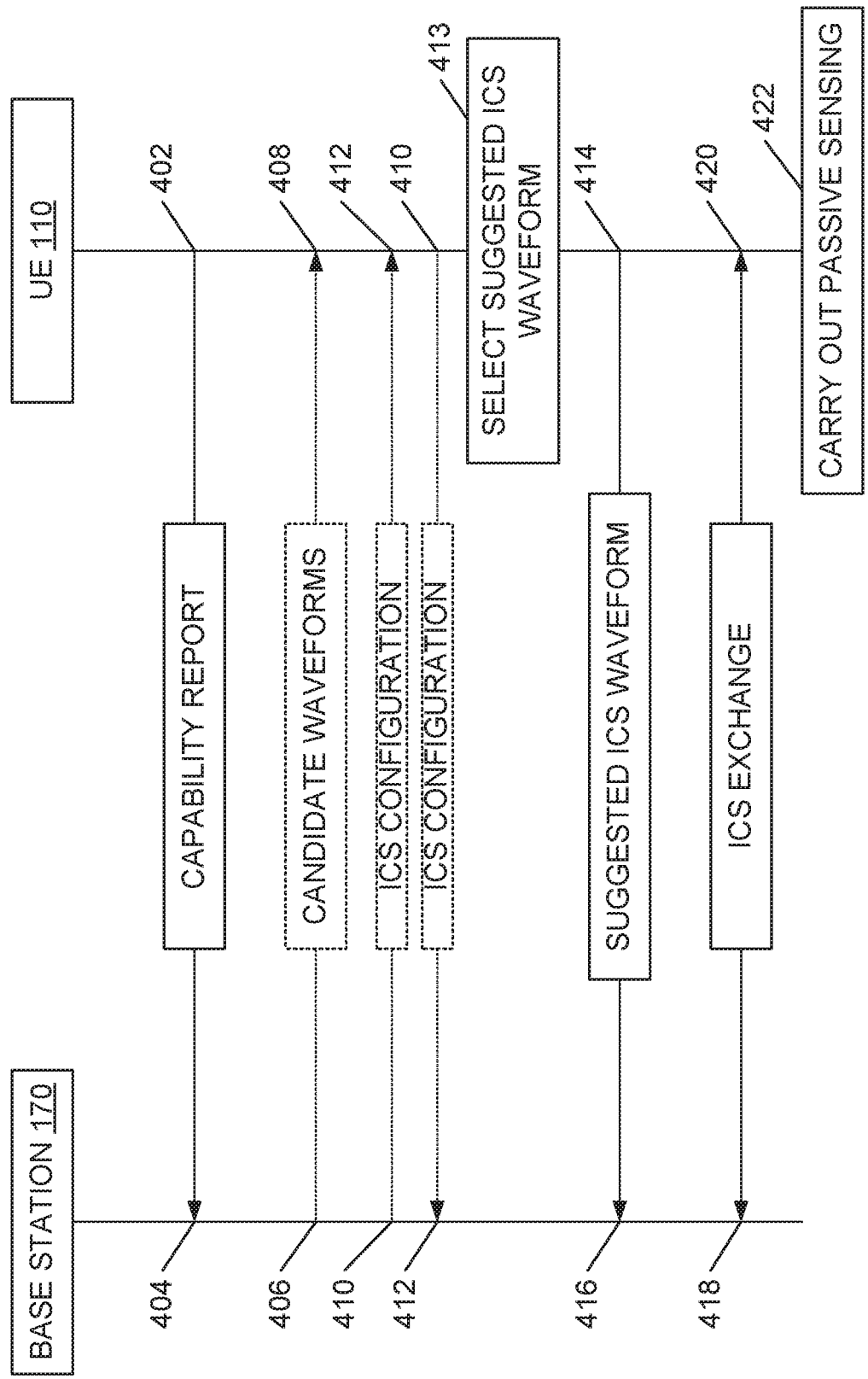
FIG. 4 illustrates, in a signal flow diagram, negotiation between the user equipment of FIG. 2 and the base station of FIG. 3 to settle upon a waveform for an ICS signal that is to be transmitted by the user equipment in an example wherein mono-static sensing is to be carried out by the user equipment according to aspects of the present application.

More detail may be considered in view of FIG. 4, which illustrates, in a signal flow diagram, interaction between the BS 170 and the UE 110.

Within the context of integrated communication and sensing, not all sensing is equal. For example, there may be considered to be at least two modes of sensing: common sensing; and dedicated sensing. A reference to common sensing may be considered to be a reference to sensing an entire coverage area to get some general information about the environment. For example, common sensing may be used to discover the existence of scatterers and the approximate location of the scatterers. In contrast, a reference to dedicated sensing may be considered to be a reference to sensing a particular region in an effort to collect more accurate information about a particular scatterer. For example, dedicated sensing may be used to discover, for the particular scatterer, a more exact location, an orientation, a material, etc.

According to aspects of the present application, the sensing operation is carried out in conjunction with a communication operation. Referenced herein is an ICS signal that is a communication signal, such as a downlink (DL) transmission, an uplink (UL) transmission or a sidelink (SL) transmission. The ICS signal also serves as a basis for sensing.

In a first example, mono-static sensing is to be carried out by the UE 110. The signal flow diagram of FIG. 4 illustrates negotiation between the UE 110 and the BS 170 to settle upon a waveform for the ICS signal that is to be transmitted by the UE 110.

Initially, the UE 110 transmits (step 402), to the BS 170, a capability report. The BS 170 receives (step 404) the capability report. The transmission (step 402) may, in one aspect, use static signaling and, in another aspect, use semi-static signaling. Semi-static signaling may, for example, include radio resource control (RRC) signaling and signaling using a control element (CE) in the known media access control (MAC) sublayer, that is, a "MAC-CE."

The capability report may include indications of waveforms supported by the UE 110. Also included in the capability report may be an indication of RF capability, an indication of RF power amplifier (PA) capability, an indication of duplexing capability, and an indication of RF processing capability. The capability report may also include an indication of supported bandwidth. In some embodiments, the supported bandwidth may further include a partial bandwidth or full bandwidth of a bandwidth part (BWP), or a plurality of BWPs. In some embodiments, the capability report may include the supported waveform for a given spectrum, BWP or a plurality of BWPs. The capability report may further include the bandwidth supported by a given carrier frequency, such as a sub-6 GHz carrier frequency band, an above 6 GHz carrier frequency band, a millimeter wave (mmWave) band, a terahertz (THz) band, and the like. In some embodiments, the capability report may include separate indications of communication capability and sensing capability. In some other embodiments, the capability report may be a joint capability report. The sensing capability report may be comprised of non-RF based sensing capability including camera capability report and LIDAR capability report. The origin of the term "LIDAR," like the origin of the term RADAR, has many explanations. In one of the explanations, the term is said to be formed from letters in the phrase Light Detection and Ranging. Recently, advances in self-driving cars have relied on LIDAR technology to allow cars to sense the environment in which the cars are expected to navigate safely.

The capability report need not stand alone specific to aspects of the present application related to waveform adaptation. Indeed, the capability report may, in some aspects of the present application, be a part of a more general capability report routinely transmitted from the UE 110 to the BS 170.

Optionally, the BS 170 may generate, based on the capability report, a shortlist of candidate waveforms to be used for the ICS signal. The BS 170 may then transmit (step 406) the shortlist to the UE 110. Upon receiving (step 408) the shortlist of candidate waveforms, the UE 110 may save the shortlist to the UE memory 208.

The UE 110 transmits (step 410) an ICS configuration indication to the BS 170. Upon receiving (step 412) the ICS configuration indication, the BS 170 may save the ICS configuration indication to the BS memory 358. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known downlink control information (DCI) information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

The ICS configuration indication can, alternatively, be transmitted (step 410) from the BS 170 and received (step 412) by the UE 110, even if the UE 110 were to perform the sensing. This may be related to the scenario in which the sensing is requested or instructed by the BS 170 to be performed by the UE 110.

The ICS configuration indication may specify a sensing-only ICS configuration with a preference for high sensing performance. Such an ICS configuration may be seen as suitable for dedicated sensing. It is known to implement a sensing-only ICS configuration using sensing pilot signals.

The ICS configuration indication may specify a sensing and communications ICS configuration. For example, the sensing and communications configuration may involve a low communications rate and a preference for high sensing performance. The low communications rate may, for example, support a data broadcast, a data multicast and/or a data groupcast, while the high sensing performance may be seen as suitable for dedicated sensing.

The ICS configuration indication may specify another sensing and communications ICS configuration, for example with a high communications rate and a medium sensing performance. The high communications rate may, for example, support a data unicast, while the medium sensing performance may be seen as suitable for common sensing.

The ICS configuration indication may also specify a communications-only ICS configuration.

The ICS configuration indication may further specify a sensing mode between a mono-static sensing mode and a multi-static sensing mode. In a mono-static sensing mode, the same device that transmits the ICS signal receives and processes reflections of the ICS signal to, thereby, carry out the sensing operation. In a multi-static sensing mode, the device that transmits the ICS signal is distinct from the devices that receive and process reflections of the ICS signal to carry out the sensing operation. An example implementation of multi-static sensing is called bi-static sensing and involves a single transmitting device and a single receiving and processing device.

The ICS configuration indication may further specify an out-of-band leakage (OBL) consideration. That is, the ICS configuration indication may specify a degree to which OBL is to be tolerated, if at all.

The ICS configuration indication may still further specify a modulation and coding scheme. In some embodiments, the ICS configuration indication may include the time/frequency resource indication over which the ICS signal is transmitted. In some embodiments, the ICS configuration indication may further include the spatial resource indication specifying over which spatial direction the ICS signal is transmitted.

Subsequent to transmitting (step 410), to the BS 170, or receiving, from the BS 170, the ICS configuration indication, the UE 110 may select (step 413) an indication of a suggested ICS waveform to satisfy the ICS strategy proposed by the ICS configuration indication. The UE 110 then transmits (step 414) an indication of the selected suggested ICS waveform to the BS 170. Notably, the selection (step 413) and transmission (step 414), by the UE 110, of a suggested ICS waveform is optional. That is, the UE 110 need not select a suggested ICS waveform. All of the ICS details may be dictated by the BS 170. The UE 110 may also transmit (not shown), to other UEs 110 in the coverage area, the indication of the selected ICS waveform. When transmitting the indication to the other UEs 110, the UE 110 may use SL communication techniques. The BS 170 receives (step 416) the indication of the selected ICS waveform and saves the indication to the BS memory 358. The BS 170 may transmit (not shown), to the UE 110, an acknowledgement of the receipt (step 416) of the indication of the selected ICS waveform. Alternatively, the BS 170 may transmit (not shown), to the UE 110, an override of the selected ICS waveform. That is, the BS 170 transmit (not shown) an indication of a replacement ICS waveform, where the replacement ICS waveform has been selected by the BS 170. The UE 110 may transmit (not shown), to the BS 170, an acknowledgement of the receipt of the indication of the selected ICS waveform.

An exchange of ICS communication may then proceed with the BS 170 transmitting (step 418) downlink (DL) communication to the UE 110 and the UE 110 transmitting (step 420) uplink (UL) communication to the BS 170 or sidelink (SL) communication to another UE 110. In particular, the UE 110 may employ the selected ICS waveform when transmitting (step 420) the UL communication or SL communication in an ICS signal. The UE 110 may then carry out passive sensing (step 422) by receiving and processing reflections of the ICS waveform transmitted in step 420.

Notably, the signal flow illustrated in FIG. 4 relates to a mono-static sensing based at the UE 110. Furthermore, the DL communication transmitted (step 418) by the BS 170 is not expected to employ the selected ICS waveform.

The selection (step 413), by the UE 110, of a suggested ICS waveform to satisfy the ICS strategy proposed by the ICS configuration indication has many potential outcomes. To assist in the making the selection (step 413), the UE 110 may maintain, in the UE memory 208, selection assistance data, such as the data presented in an example table 500 illustrated in FIG. 5.

The example table 500 includes a section for ICS configuration strategy, a section for ICS capability and a section for OBL. Along the left side of the example table 500 are references to five candidate ICS waveforms. The references to candidate ICS waveforms include: a reference to a FMCW waveform; a reference to CP-OFDM; a reference to OFDM (without CP); a reference to a Filter Bank Multicarrier (FBMC) waveform; and a reference to a Ultra-Wideband (UWB) pulse radar waveform. A given row of the example table 500 is associated with a given one of the five candidate ICS waveforms.

Within each row and within the section for ICS configuration strategy is an indication of the suitability of the given one of the five candidate ICS waveforms to each of the configuration strategies. In the example table 500 of FIG. 5, the suitability is indicated either with a "√" to represent suitability or with an "X" to represent unsuitability.

Additionally, within each row and within the section for ICS capability is an indication of the suitability of the given one of the five candidate ICS waveforms to each of the ICS capabilities. In the example table 500 of FIG. 5, the suitability is indicated either with a "√" to represent suitability or with a specific note to represent conditional suitability. In particular, a specific note indicates that CP-OFDM is suitable in the presence of "high" RF capability. Further particularly, a specific note indicates that CP-OFDM is suitable in the presence of full duplex capability. In another example, a specific note indicates that OFDM (without CP) is suitable in the presence of "high" RF power amplifier (PA) capability. Furthermore, a specific note indicates that OFDM (without CP) is suitable when the UE has "high" processing capability. A similar note indicates that FBMC is suitable when the UE has "high" processing capability.

Furthermore, within each row and within the section for OBL is an indication of the tolerance to OBL of each of the five candidate ICS waveforms. A "√" is used to indicate that FBMC is tolerant of OBL. An "X" is used to indicate that UWB pulse radar is intolerant of OBL. An "OK" note indicates that FMCW, CP-OFDM and OFDM without CP are reasonably tolerant of OBL.

As should be well understood, the example table 500 illustrated in FIG. 5 is merely one example. Alternative tables may be different from the example table 500 illustrated in FIG. 5 in the waveforms that are decided between, the configuration strategies and the capabilities.

Figure 6:
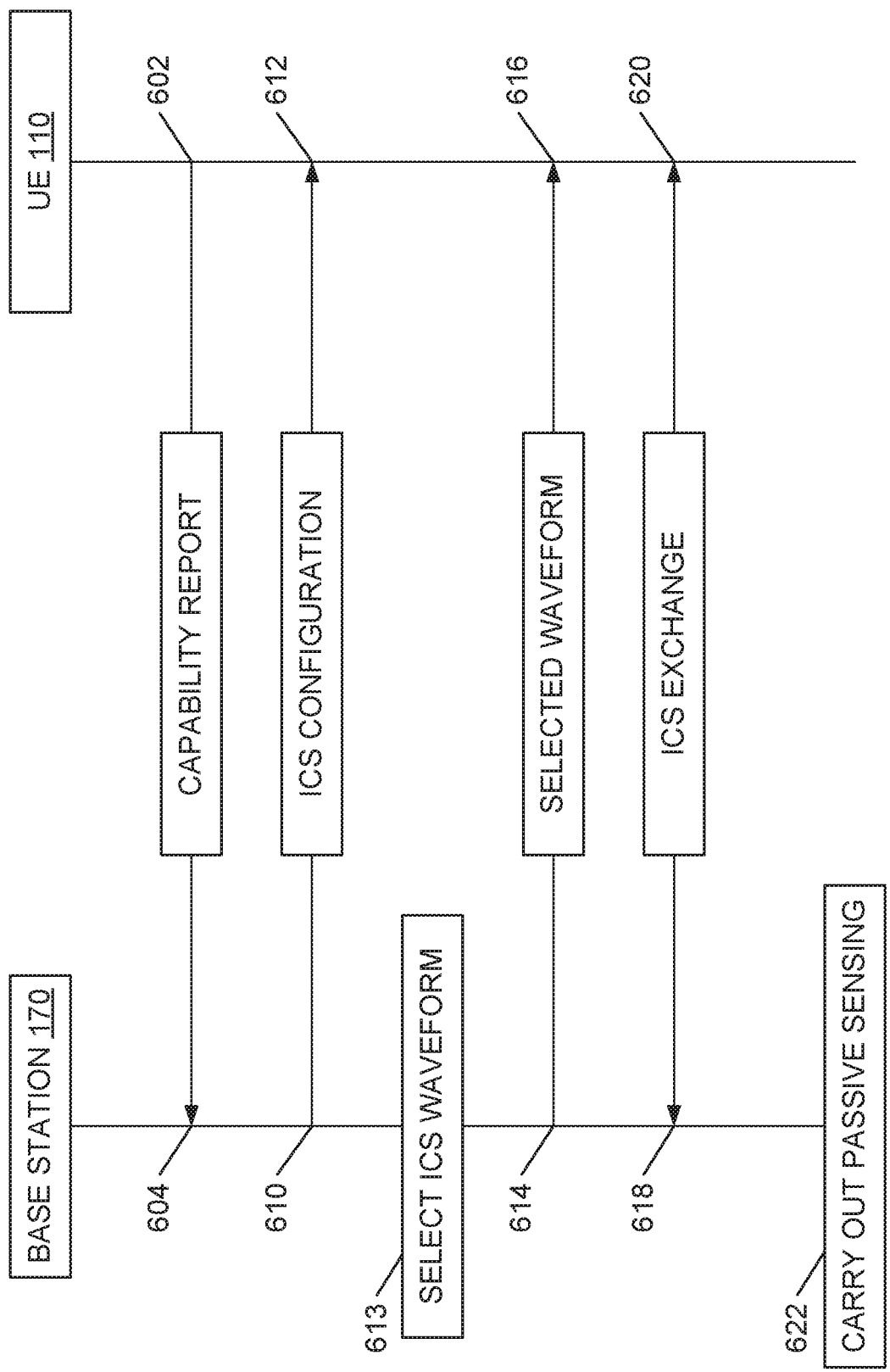
FIG. 6 illustrates, in a signal flow diagram, negotiation between the user equipment of FIG. 2 and the base station of FIG. 3 to settle upon a waveform for an ICS signal that is to be transmitted by the base station in an example wherein mono-static sensing is to be carried out by the base station according to aspects of the present application.

FIG. 6 illustrates, in a signal flow diagram, interaction between the BS 170 and the UE 110 for a scenario wherein the BS 170 performs mono-static sensing.

In the example of FIG. 6, mono-static sensing is to be carried out by the BS 170. The signal flow diagram of FIG. 6 illustrates communication between the UE 110 and the BS 170 so that the UE 110 can anticipate a particular waveform for the ICS signal that is to be transmitted by the BS 170.

Initially, the UE 110 transmits (step 602), to the BS 170, a capability report. The BS 170 receives (step 604) the capability report. The transmission (step 602) may, in one aspect, use static signaling and, in another aspect, use semi-static signaling. The capability report may also include an indication of supported bandwidth. In some embodiments, the capability report may include separate indications of communication capability and sensing capability. In some other embodiments, the capability report may be a joint capability report. The sensing capability report may be comprised of non-RF based sensing capability including camera capability report and LIDAR capability report.

The BS 170 transmits (step 610) an ICS configuration indication to the UE 110. Upon receiving (step 612) the ICS configuration indication, the UE 110 may save the ICS configuration indication to the UE memory 208. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 610), to the UE 110, the ICS configuration indication, the BS 170 selects (step 613) an ICS waveform to satisfy the ICS strategy proposed by the ICS configuration indication. The BS 170 then transmits (step 614) an indication of the selected ICS waveform to the UE 110. The transmission (step 614) of the indication of the selected ICS waveform to the UE 110 may be part of a broadcast or a groupcast of the indication of the selected ICS waveform. The UE 110 receives (step 616) the indication of the selected ICS waveform and saves the indication to the UE memory 208.

An exchange of ICS communication may then proceed with the BS 170 transmitting (step 618) DL communication to the UE 110 and the UE 110 transmitting (step 620) UL communication to the BS 170. In particular, the BS 170 may employ the selected ICS waveform when transmitting (step 618) the DL communication in an ICS signal. The BS 170 may then carry out passive sensing (step 622) by receiving and processing reflections of the ICS waveform transmitted in step 618.

Given that the signal flow illustrated in FIG. 6 relates to a mono-static sensing based at the BS 170, the UL communication transmitted (step 620) by the UE 110 is not expected to employ the selected ICS waveform.

In this case, the ICS waveform selection is performed by the BS 170 based on ICS capability report from the UE 110.

In a further embodiment, the method of FIG. 6 can be extended to mono-static sensing at a plurality of BSs, such as BS 170A and BS 170B. In this case, the UE 110 may send the capability report to only one BS (e.g., BS 170A) and this BS may share the information with other BSs. In some embodiments, the UE 110 may broadcast the capability report so all BSs will simultaneously receive the capability report. In some embodiments, each BS sends a separate ICS configuration indication to the UE. In some embodiments, each BS sends a separate selected waveform indication to the UE. In some embodiments, the selected waveform indication may include the waveform parameters which are specific to each BS. For example, a waveform parameter specific to a BS may be a signature function which can be applied on the selected waveform to obtain the ICS waveform transmitted by each BS. In some embodiments, the waveforms selected by different BSs are different. In some embodiments, the waveforms selected by the BSs are the same but each selected waveform uses a different waveform parameter.

Figure 7:
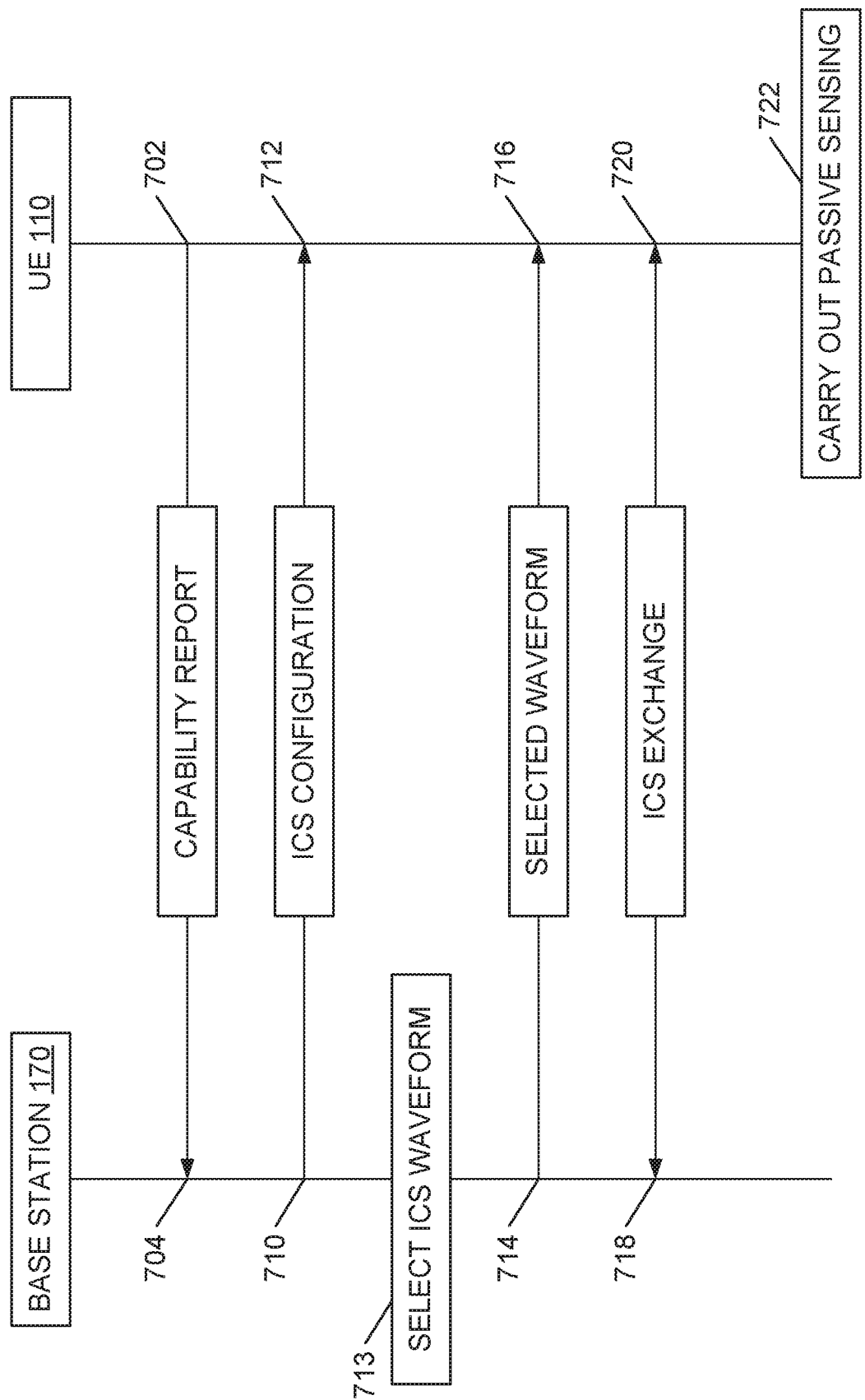
FIG. 7 illustrates, in a signal flow diagram, negotiation between the user equipment of FIG. 2 and the base station of FIG. 3 to settle upon a waveform for an ICS signal that is to be transmitted by the base station in an example wherein bi-static sensing is to be carried out with the user equipment receiving the ICS signal according to aspects of the present application.

FIG. 7 illustrates, in a signal flow diagram, interaction between the BS 170 and the UE 110 for a scenario wherein bi-static sensing is performed with the BS 170 transmitting an ICS signal with a selected ICS waveform and the UE 110 performing the sensing.

Initially, the UE 110 transmits (step 702), to the BS 170, a capability report. The BS 170 receives (step 704) the capability report. The transmission (step 702) may, in one aspect, use static signaling and, in another aspect, use semi-static signaling.

The BS 170 transmits (step 710) an ICS configuration indication to the UE 110. Upon receiving (step 712) the ICS configuration indication, the UE 110 may save the ICS configuration indication to the UE memory 208. Notably, upon receiving (step 712) the ICS configuration indication, the UE 110 may also transmit (not shown) the ICS configuration indication to other UEs 110 in the coverage area. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 710), to the UE 110, the ICS configuration indication, the BS 170 selects (step 713) an ICS waveform to satisfy the ICS strategy proposed by the ICS configuration indication. The BS 170 then transmits (step 714) an indication of the selected ICS waveform to the UE 110. The transmission (step 714) of the indication of the selected ICS waveform to the UE 110 may be part of a broadcast or a groupcast or a unicast of the indication of the selected ICS waveform. The UE 110 receives (step 716) the indication of the selected ICS waveform and saves the indication to the UE memory 208.

An exchange of ICS communication may then proceed with the BS 170 transmitting (step 718) DL communication to the UE 110 and the UE 110 transmitting (step 720) UL communication to the BS 170. In particular, the BS 170 may employ the selected ICS waveform when transmitting (step 718) the DL communication in an ICS signal. The UE 110 may then carry out passive sensing (step 722) by receiving and processing reflections of the ICS waveform transmitted, by the BS 170, in step 718.

In this case, the ICS waveform selection is performed by the BS 170 based on ICS capability report from the UE 110.

Figure 8:
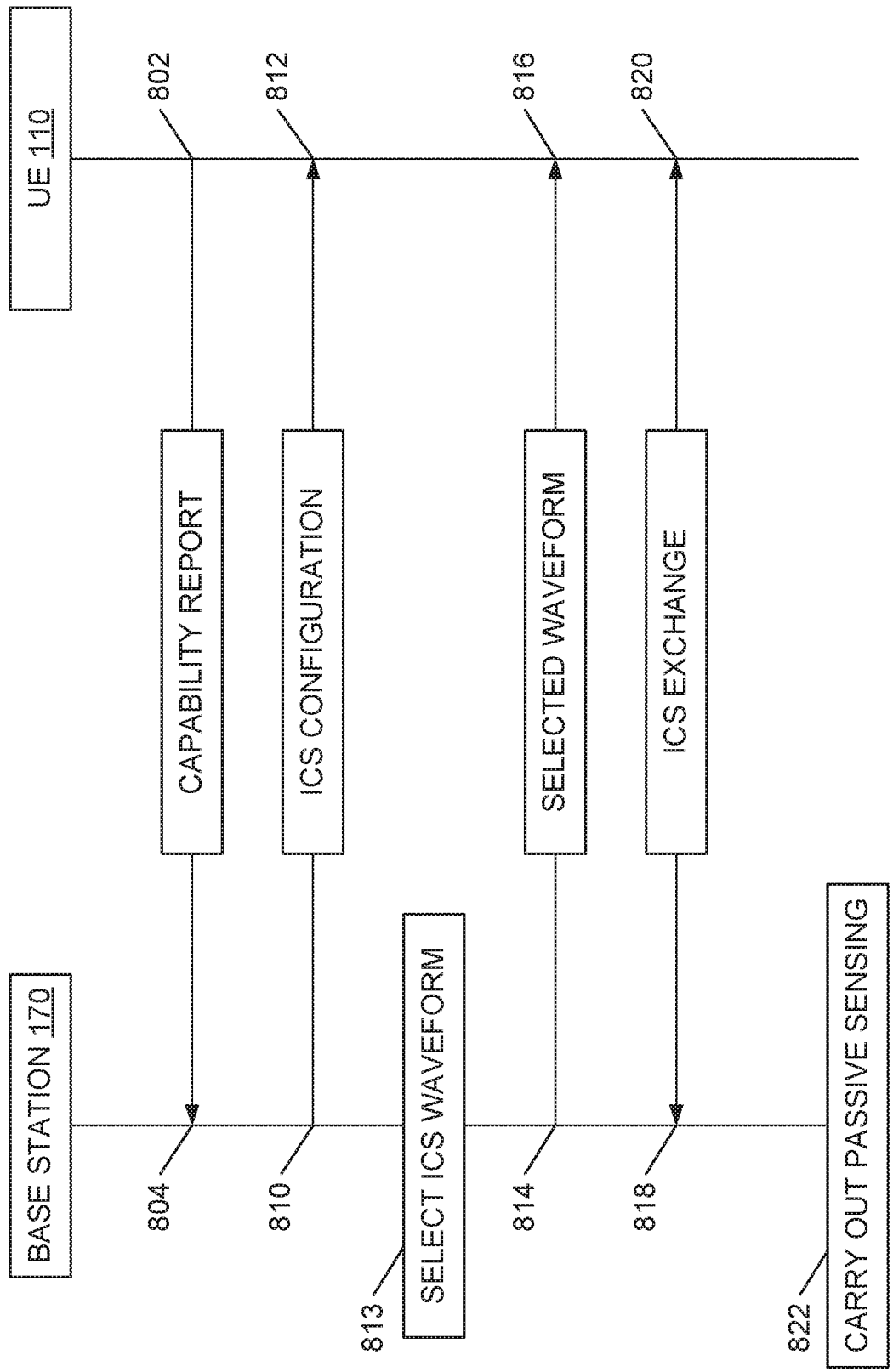
FIG. 8 illustrates, in a signal flow diagram, negotiation between the user equipment of FIG. 2 and the base station of FIG. 3 to settle upon a waveform for an ICS signal that is to be transmitted by the user equipment in an example wherein bi-static sensing is to be carried out with the base station receiving the ICS signal according to aspects of the present application.

FIG. 8 illustrates, in a signal flow diagram, interaction between the BS 170 and the UE 110 for a scenario wherein bi-static sensing is performed with the UE 110 transmitting an ICS signal with a selected ICS waveform and the BS 170 performing the passive sensing, by receiving and processing reflections of the ICS waveform transmitted, by the UE 110.

Initially, the UE 110 transmits (step 802), to the BS 170, a capability report. The BS 170 receives (step 804) the capability report. The transmission (step 802) may, in one aspect, use static signaling and, in another aspect, use semi-static signaling.

The BS 170 transmits (step 810) an ICS configuration indication to the UE 110. Upon receiving (step 812) the ICS configuration indication, the UE 110 may save the ICS configuration indication to the UE memory 208. Notably, upon receiving (step 812) the ICS configuration indication, the UE 110 may also transmit (not shown) the ICS configuration indication to other UEs 110 in the coverage area. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 810), to the UE 110, the ICS configuration indication, the BS 170 selects (step 813) an ICS waveform to satisfy the ICS strategy proposed by the ICS configuration indication. The BS 170 then transmits (step 814) an indication of the selected ICS waveform to the UE 110. The transmission (step 814) of the indication of the selected ICS waveform to the UE 110 may be part of a broadcast or a groupcast or a unicast of the indication of the selected ICS waveform. The UE 110 receives (step 816) the indication of the selected ICS waveform and saves the indication to the UE memory 208.

An exchange of ICS communication may then proceed with the BS 170 transmitting (step 818) DL communication to the UE 110 and the UE 110 transmitting (step 820) UL communication to the BS 170. In particular, the UE 110 may employ the selected ICS waveform when transmitting (step 820) the UL communication in an ICS signal. The BS 170 may then carry out passive sensing (step 822) by receiving and processing reflections of the ICS waveform transmitted, by the UE 110, in step 820.

In this case, the ICS waveform selection may be performed by the UE 110 based on a recommendation from the BS 170. In some embodiments, the waveform selection is performed by the BS 170 and the waveform selection indication is transmitted to the UE 110.

Figure 9:
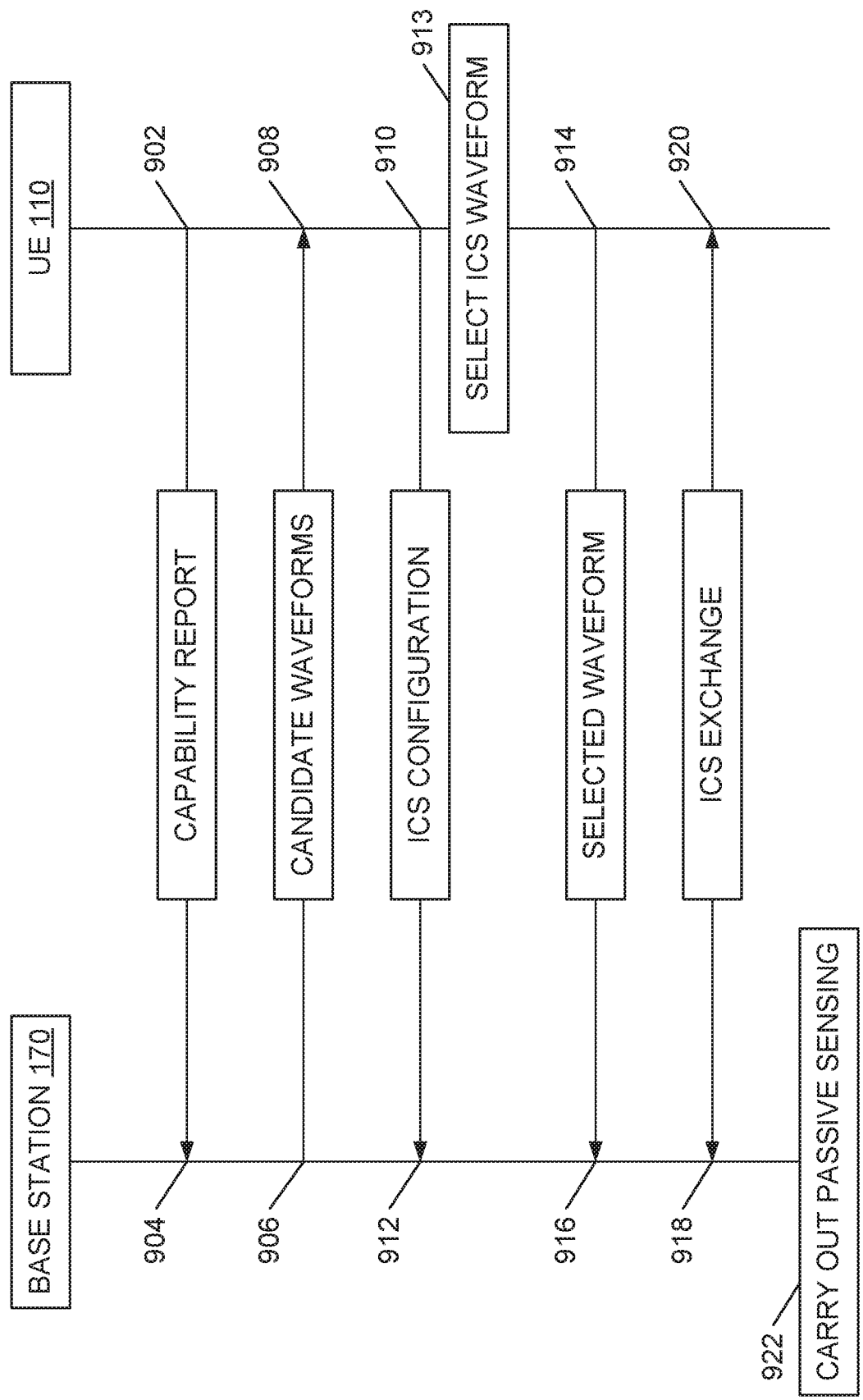
FIG. 9 illustrates, in a signal flow diagram as an alternative to the signal flow diagram of FIG. 8, negotiation between the user equipment of FIG. 2 and the base station of FIG. 3 to settle upon a waveform for an ICS signal that is to be transmitted by the user equipment in an example wherein bi-static sensing is to be carried out with the base station receiving the ICS signal according to aspects of the present application.

FIG. 9 illustrates, in a signal flow diagram as an alternative to the signal flow diagram of FIG. 8, interaction between the BS 170 and the UE 110 for a scenario wherein bi-static sensing is performed with the UE 110 transmitting an ICS signal with a selected ICS waveform and the BS 170 performing the passive sensing, by receiving and processing reflections of the ICS waveform transmitted, by the UE 110.

Initially, the UE 110 transmits (step 902), to the BS 170, a capability report. The BS 170 receives (step 904) the capability report. The transmission (step 902) may, in one aspect, use static signaling and, in another aspect, use semi-static signaling.

The BS 170 may generate, based on the capability report, a shortlist of candidate waveforms to be used for the ICS signal. The BS 170 may then transmit (step 906) the shortlist to the UE 110. Upon receiving (step 908) the shortlist of candidate waveforms, the UE 110 may save the shortlist to the UE memory 208.

The UE 110 transmits (step 910) an ICS configuration indication to the BS 170. Upon receiving (step 912) the ICS configuration indication, the BS 170 may save the ICS configuration indication to the BS memory 358. Notably, the UE 110 may also transmit (not shown) the ICS configuration indication to other UEs 110 in the coverage area. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 910), to the BS 170, the ICS configuration indication, the UE 110 selects (step 913) an ICS waveform to satisfy the ICS strategy proposed by the ICS configuration indication. The UE 110 then transmits (step 914) an indication of the selected ICS waveform to the BS 170. The UE 110 may also transmit, to other UEs 110 in the coverage area, the indication of the selected ICS waveform. When transmitting the indication to the other UEs 110, the UE 110 may use SL communication techniques. The BS 170 receives (step 916) the indication of the selected ICS waveform and saves the indication to the BS memory 358. The BS 170 may transmit (not shown), to the UE 110, an acknowledgement of the receipt (step 916) of the indication of the selected ICS waveform. Alternatively, the BS 170 may transmit (not shown), to the UE 110, an override of the selected ICS waveform. That is, the BS 170 transmit (not shown) an indication of a different ICS waveform, where the different ICS waveform has been selected by the BS 170.

An exchange of ICS communication may then proceed with the BS 170 transmitting (step 918) DL communication to the UE 110 and the UE 110 transmitting (step 920) UL communication to the BS 170. In particular, the UE 110 may employ the selected ICS waveform when transmitting (step 920) the UL communication in an ICS signal. The BS 170 may then carry out passive sensing (step 922) by receiving and processing reflections of the ICS waveform transmitted, by the UE 110, in step 920.

Figure 10:
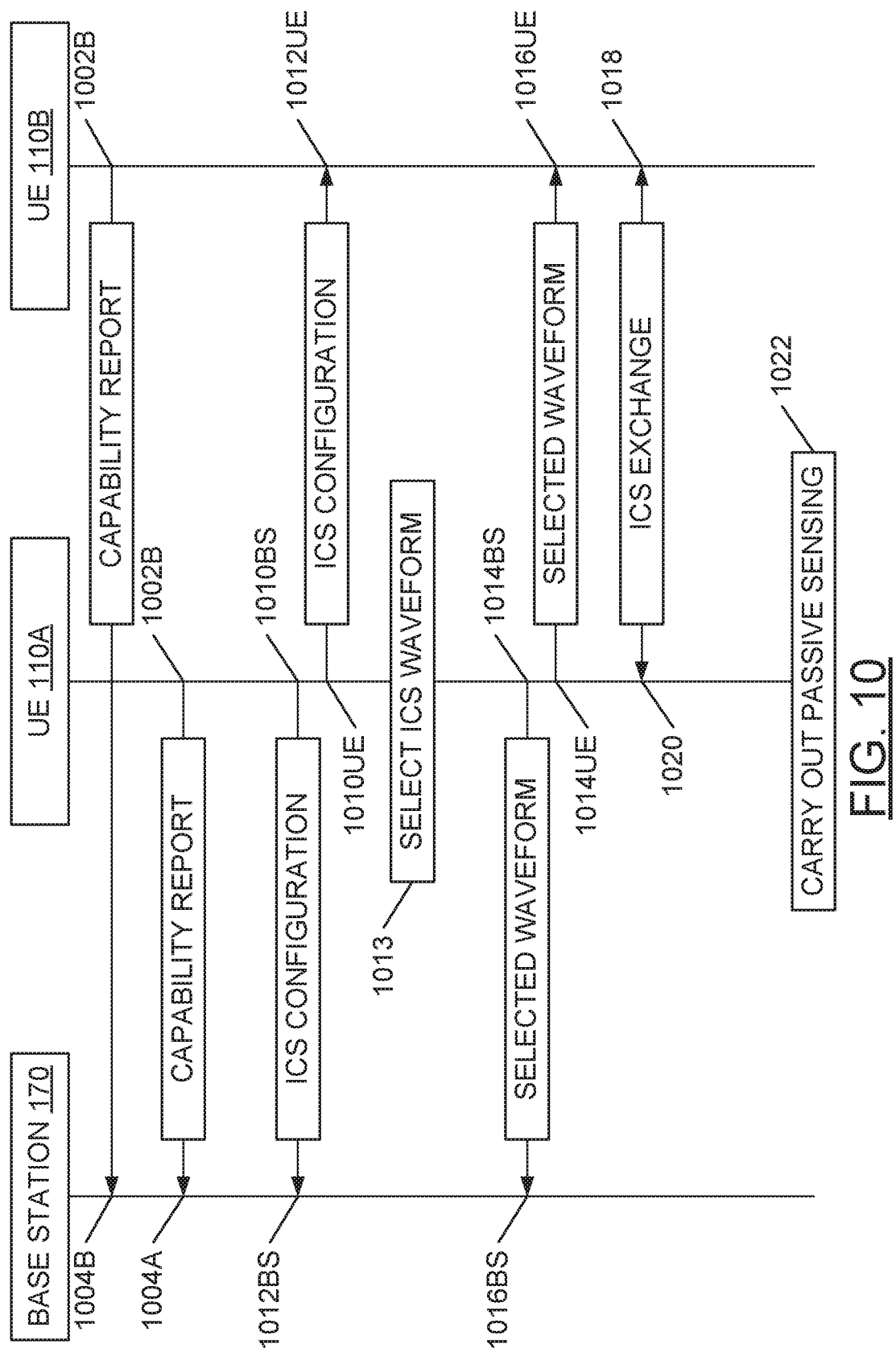
FIG. 10 illustrates, in a signal flow diagram, negotiation between two user equipments of FIG. 1 and the base station of FIG. 3 to settle upon a waveform for an ICS signal that is to be transmitted by one user equipment in an example wherein bi-static sensing is to be carried out with the other user equipment receiving the ICS signal according to aspects of the present application.

FIG. 10 illustrates, in a signal flow diagram, interaction between the BS 170, the first UE 110A and the second UE 110B for a scenario wherein bi-static sensing is performed with the second UE 110B transmitting an ICS signal with an ICS waveform selected by the first UE 110A and the first UE 110A performing the passive sensing, by receiving and processing reflections of the ICS waveform transmitted, by the UE 110B.

Initially, the first UE 110A transmits (step 1002A), to the BS 170, a capability report. The BS 170 receives (step 1004A) the capability report. Additionally, the second UE 110B transmits (step 1002B), to the BS 170, a capability report. The BS 170 receives (step 1004B) the capability report. The transmissions (steps 1002A and 1002B) may, in one aspect, use static signaling and, in another aspect, use semi-static signaling.

The first UE 110A transmits (step 1010BS) an ICS configuration indication to the BS 170. Upon receiving (step 1012BS) the ICS configuration indication, the BS 170 may save the ICS configuration indication to the BS memory 358. Notably, the first UE 110A may also transmit (step 1010UE) the ICS configuration indication to the second UE 110B. Upon receiving (step 1012UE) the ICS configuration indication, the second UE 110B may save the ICS configuration indication to the UE memory 208. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 1010BS), to the BS 170, the ICS configuration indication, the first UE 110A selects (step 1013) an ICS waveform to satisfy the ICS strategy proposed by the ICS configuration indication. The first UE 110A then transmits (step 1014BS) an indication of the selected ICS waveform to the BS 170. The BS 170 receives (step 1016BS) the indication of the selected ICS waveform and saves the indication to the BS memory 358. The first UE 110A also transmits (step 1014UE) the indication of the selected ICS waveform to the second UE 110B. The second UE 110B receives (step 1016UE) the indication of the selected ICS waveform and saves the indication to the UE memory 208. The UE 110 may also transmit, to other UEs 110 in the coverage area, the indication of the selected ICS waveform. When transmitting the indication to the other UEs 110, the UE 110 may use SL communication techniques.

An exchange of ICS communication may then proceed with the second UE 110B transmitting (step 1018) SL communication to the first UE 110A and the first UE 110A transmitting (step 1020) SL communication to the second UE 110B. In particular, the second UE 110B may employ the selected ICS waveform when transmitting (step 1020) the SL communication in an ICS signal. The first UE 110A may then carry out passive sensing (step 1022) by receiving and processing reflections of the ICS waveform transmitted, by the second UE 110B, in step 1018.

Figure 11:
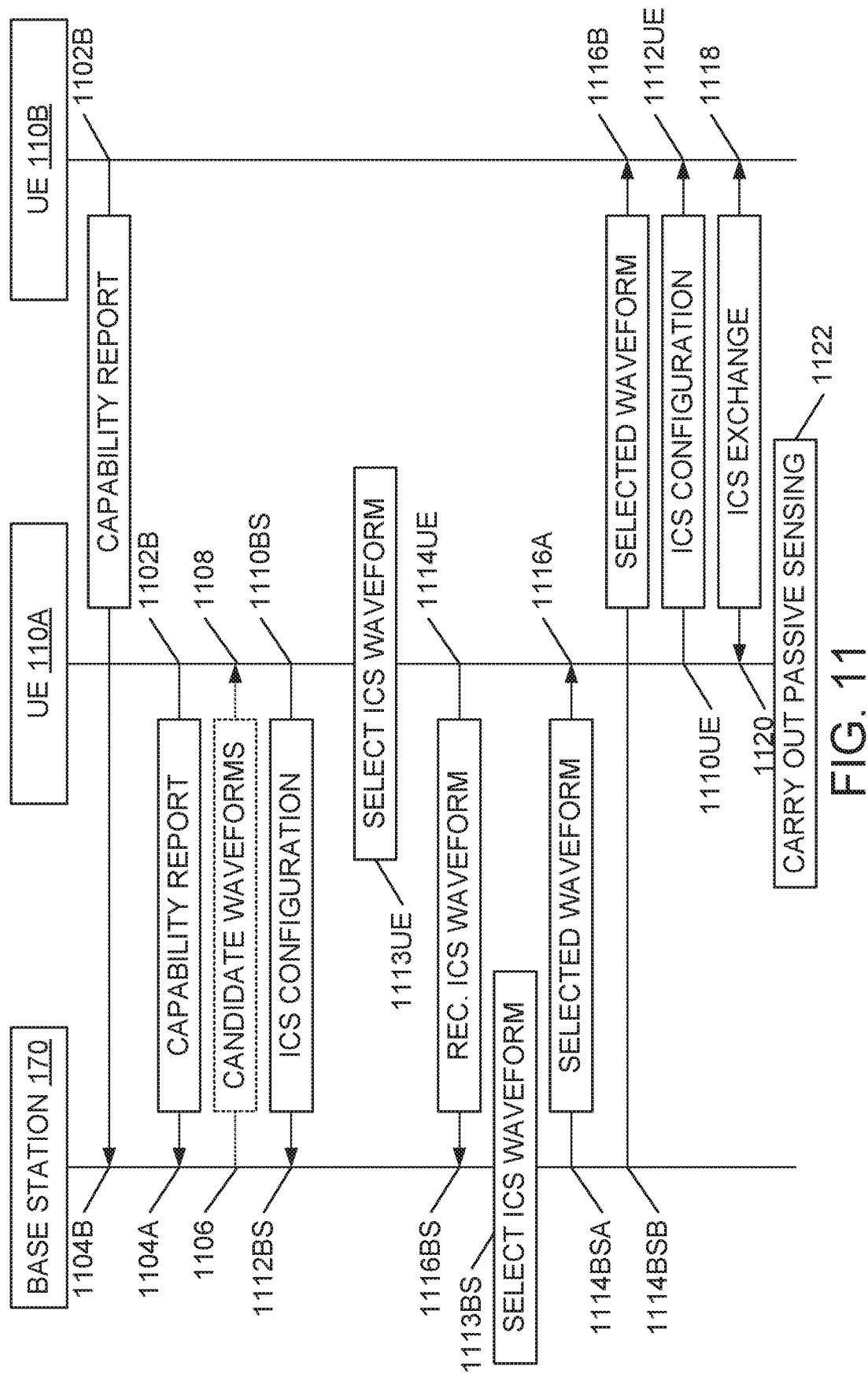
FIG. 11 illustrates, in a signal flow diagram as an alternative to the signal flow diagram of FIG. 10, negotiation between two user equipments of FIG. 1 and the base station of FIG. 3 to settle upon a waveform for an ICS signal that is to be transmitted by one user equipment in an example wherein bi-static sensing is to be carried out with the other user equipment receiving the ICS signal according to aspects of the present application.

FIG. 11 illustrates, in a signal flow diagram, interaction between the BS 170, the first UE 110A and the second UE 110B for a scenario wherein bi-static sensing is performed with the second UE 110B transmitting an ICS signal with an ICS waveform selected by the BS 170 and the first UE 110A performing the passive sensing, by receiving and processing reflections of the ICS waveform transmitted, by the UE 110B.

Initially, the first UE 110A transmits (step 1102A), to the BS 170, a capability report. The BS 170 receives (step 1104A) the capability report. Additionally, the second UE 110B transmits (step 1102B), to the BS 170, a capability report. The BS 170 receives (step 1104B) the capability report. The transmissions (steps 1102A and 1102B) may, in one aspect, use static signaling and, in another aspect, use semi-static signaling.

Optionally, the BS 170 may generate, based on the capability reports, a shortlist of candidate waveforms to be used for the ICS signal. The BS 170 may then transmit (step 1106) the shortlist to the first UE 110A. Upon receiving (step 1108) the shortlist of candidate waveforms, the first UE 110A may save the shortlist to the UE memory 208.

The first UE 110A transmits (step 1110BS) an ICS configuration indication to the BS 170. Upon receiving (step 1112BS) the ICS configuration indication, the BS 170 may save the ICS configuration indication to the BS memory 358. In some embodiments, the ICS configuration indication may be a dynamic signaling, which can be changed from one indication to another. In this dynamic signaling case, the ICS configuration indication can be signaled to the BS 170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 170 using higher layer signaling, e.g., through RRC signaling or signaling that uses the MAC-CE.

Subsequent to transmitting (step 1110BS), to the BS 170, the ICS configuration indication, the first UE 110A selects (step 1113UE) a "recommended" ICS waveform to satisfy the ICS strategy proposed by the ICS configuration indication. The first UE 110A then transmits (step 1114UE) an indication of the recommended ICS waveform to the BS 170. The BS 170 receives (step 1116BS) the indication of the recommended ICS waveform and saves the indication to the BS memory 358.

Notably, the first UE 110A may also transmit (step 1110UE) the ICS configuration indication to the second UE 110B and to other UEs 110 in the coverage area. Upon receiving (step 1112UE) the ICS configuration indication, the second UE 110B may save the ICS configuration indication to the UE memory 208.

Despite having received (step 1116BS) the indication of the recommended ICS waveform, the BS 170 may select (step 1113BS) a distinct ICS waveform. The BS 170 may then transmit (1114BSA) an indication of the selected ICS waveform to the first UE 110A. Upon receiving (step 1116A) the indication of the selected ICS waveform, the first UE 110A may save the indication of the selected ICS waveform to the UE memory 208. The BS 170 may further transmit (1114BSB) an indication of the selected ICS waveform to the second UE 110B. Upon receiving (step 1116B) the indication of the selected ICS waveform, the second UE 110B may save the indication of the selected ICS waveform to the UE memory 208.

An exchange of ICS communication may then proceed with the second UE 110B transmitting (step 1118) SL communication to the first UE 110A and the first UE 110A transmitting (step 1120) SL communication to the second UE 110B. In particular, the second UE 110B may employ the selected ICS waveform when transmitting (step 1118) the SL communication in an ICS signal. The first UE 110A may then carry out passive sensing (step 1122) by receiving and processing reflections of the ICS waveform transmitted, by the second UE 110B, in step 1118.

It has been described hereinbefore that the selection of an ICS waveform by the UE 110 (step 413, 913 or 1113UE) or by the BS 170 (step 613, 713, 813 or 1113BS) may be carried out in view of data such as presented in the example table 500 of FIG. 5. Notably, further data may be taken into consideration when selecting an ICS waveform. For example, there may be key performance indicators (KPIs) associated with sensing and the selection of the ICS waveform may take these KPIs into consideration. Additionally, there may be consideration of a sensing "mode." The mode may relate to common sensing or directed sensing.

Figure 12:
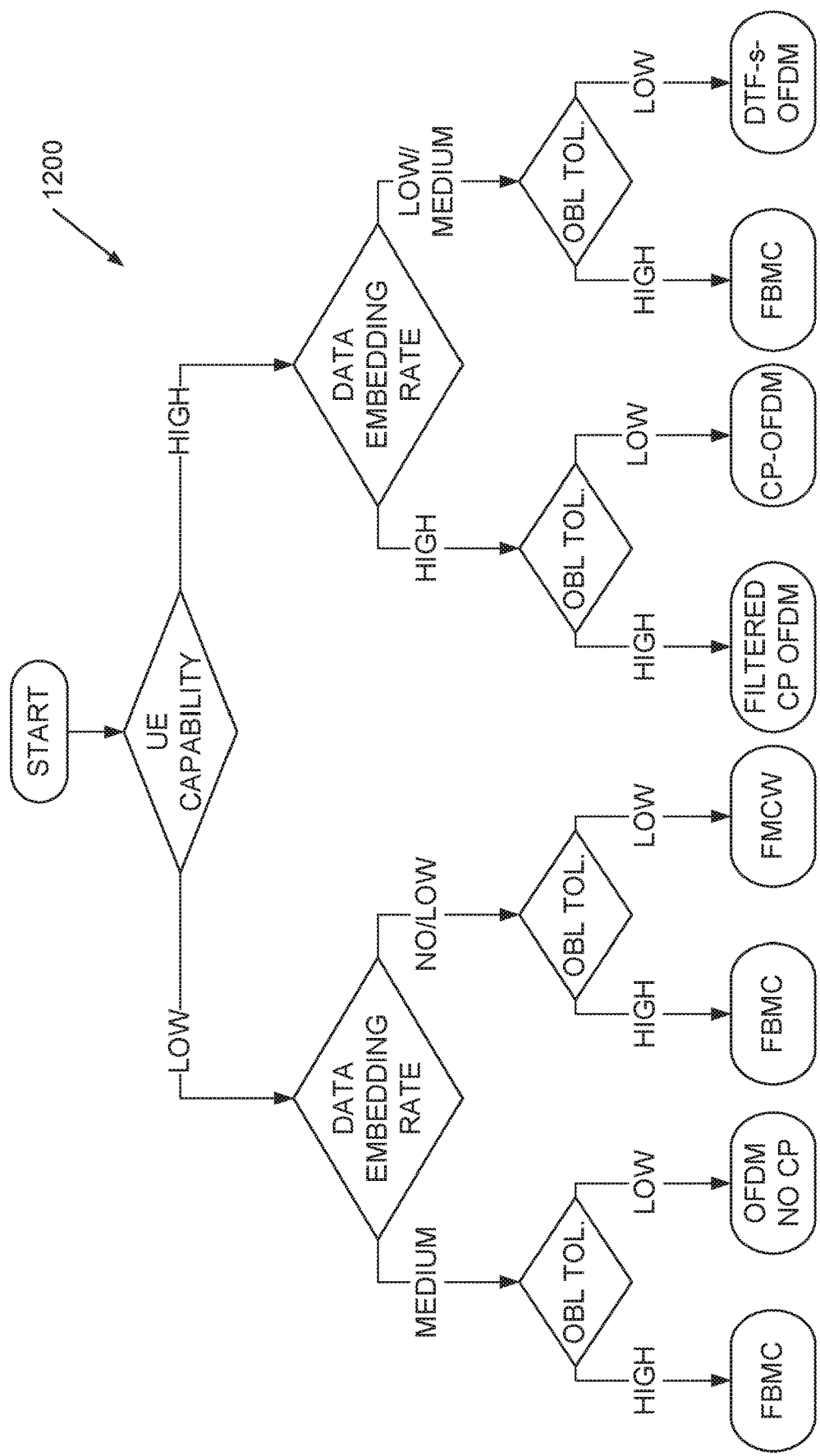
FIG. 12 illustrates an example of a decision tree to aid the selection of an ICS waveform by the user equipment of FIG. 2 or the base station of FIG. 3 according to aspects of the present application.

The selection of an ICS waveform by the UE 110 (step 413, 913 or 1113UE) or by the BS 170 (step 613, 713, 813 or 1113BS) may be carried out in view of an example decision tree 1200 illustrated in FIG. 12. As should be well understood, the decision tree 1200 illustrated in FIG. 12 is merely one example. Alternative decision trees may be different from the decision tree 1200 illustrated in FIG. 12 both in the waveforms that are decided between and the criteria for making the decisions.

When the UE 110 has reported (in, e.g., step 404) that the capability of the UE hardware is relatively low, there may be considered to be at least four waveform choices. For an ICS configuration strategy with a medium data embedding rate and high OBL tolerance, an FBMC waveform may be selected. For an ICS configuration strategy with a medium data embedding rate and low OBL tolerance, an OFDM waveform with no CP may be selected. For an ICS configuration strategy with a no or low data embedding rate and high OBL tolerance, an FBMC waveform may be selected. For an ICS configuration strategy with a no or low data embedding rate and low OBL tolerance, an FMCW waveform may be selected.

When the UE 110 has reported (in, e.g., step 404) that the capability of the UE hardware is relatively high, there may be considered to be at least four waveform choices. For an ICS configuration strategy with a high data embedding rate and high OBL tolerance, a filtered CP OFDM waveform may be selected. For an ICS configuration strategy with a high data embedding rate and low OBL tolerance, a CP-OFDM waveform may be selected. For an ICS configuration strategy with a low or medium data embedding rate and high OBL tolerance, an FBMC waveform may be selected. For an ICS configuration strategy with a low or medium data embedding rate and low OBL tolerance, a Direct Fourier Transform spread OFDM (DTF-s-OFDM) waveform may be selected.

In a first example of operation, waveform selection may be considered for each step in a two-step sensing approach that includes a first step of common sensing and a second step of dedicated sensing. Both types of sensing may be carried out at the BS 170 using mono-static sensing.

In the performance of the common sensing step, the BS 170 is to sense the entire coverage area to obtain some general information about the environment.

In view of FIG. 6, the BS 170 transmits (step 610) an ICS configuration indication to the UE 110 indicating that the ICS configuration strategy relates to common sensing with unicast data. The BS 170 then selects (step 613) an ICS waveform to satisfy the common sensing with unicast data strategy. For example, the BS 170 may select (step 613) the CP-OFDM waveform. The BS 170 then transmits (step 614) an indication of the CP-OFDM waveform to the UE 110. Indeed, the transmission (step 614) may employ broadcast signaling so that other UEs 110 also receive the indication of the CP-OFDM waveform. The BS 170 then transmits (step 618) DL communication to the UE 110 using the CP-OFDM waveform. As a result of carrying out (step 622) the common passive sensing, the BS 170 may determine the presence of a target of interest near the UE 110 and, responsively, the BS 170 may initiate the second sensing step.

In the performance of the dedicated sensing step, the BS 170 is to sense with a goal of obtaining more accurate information about the target of interest.

With this goal in mind, the BS 170 transmits (step 610) an ICS configuration indication to the UE 110 indicating that the ICS configuration strategy relates to dedicated sensing with broadcast data. The BS 170 then selects (step 613) an ICS waveform to satisfy the dedicated sensing with broadcast data strategy. For example, the BS 170 may select (step 613) the OFDM waveform with no CP. The BS 170 then transmits (step 614) an indication of the OFDM waveform with no CP to the UE 110. The BS 170 then transmits (step 618) DL communication to the UE 110 using the OFDM waveform with no CP. As a result of carrying out (step 622) the dedicated sensing, the BS 170 may obtain more accurate information about the target of interest.

In a second example of operation, waveform selection may be considered for each step in a two-step sensing approach that includes a first step of common sensing and a second step of dedicated sensing. The common sensing step may be carried out at the BS 170 using mono-static sensing. The dedicated sensing step may be carried out at the first UE 110A using bi-static sensing.

In the performance of the common sensing step, the BS 170 is to sense the entire coverage area to obtain some general information about the environment.

In view of FIG. 6, the BS 170 transmits (step 610) an ICS configuration indication to the first UE 110A indicating that the ICS configuration strategy relates to common sensing with a low data rate. The BS 170 then selects (step 613) an ICS waveform to satisfy the common sensing with low data rate strategy. For example, the BS 170 may select (step 613) the OFDM waveform with no CP. The BS 170 then transmits (step 614) an indication of the OFDM waveform with no CP to the first UE 110A. Indeed, the transmission (step 614) may employ group-cast signaling so that other UEs 110 also receive the indication of the OFDM waveform with no CP. The BS 170 then transmits (step 618) DL communication to the first UE 110A using the OFDM waveform with no CP. As a result of carrying out (step 622) the common passive sensing, the BS 170 may determine the presence of a target of interest near the first UE 110A and, responsively, the BS 170 may initiate the second sensing step.

In the performance of the dedicated sensing step, the first UE 110A is to sense with a goal of obtaining more accurate information about the target of interest.

With this goal in mind, the BS 170 may employ the transmission (step 618) of the common sensing ICS signal carrying DL communication to the first UE 110A to transmit (step 610) an ICS configuration indication to the first UE 110A indicating that the ICS configuration strategy relates to a sensing-only ICS signal.

Furthermore, in view of FIG. 11, the BS 170 may select (step 1113BS) an ICS waveform to satisfy the sensing-only strategy. For example, the BS 170 may select (step 1113BS) the FMCW waveform. The selection (step 1113BS) the FMCW waveform may be based on the capability reports received (steps 1104A and 1104B) from the UEs 110A, 110B and based on the sensing-only ICS configuration strategy. The BS 170 may employ the transmission (step 618) of the common sensing ICS signal carrying DL communication to the first UE 110A to transmit (1114BSA) an indication of the FMCW waveform to the first UE 110A. The BS 170 may employ the transmission (step 618) of the common sensing ICS signal carrying DL communication to the second UE 110B to transmit (step 1114BSB) an indication of the FMCW waveform to the second UE 110B. The transmission (step 1114BSA, 1114BSB) the indication of the FMCW waveform to the UEs 110A, 110B may employ group-cast signaling.

The second UE 110B then transmits (step 1118) SL communication to the first UE 110A and the first UE 110A transmits (step 1120) SL communication to the second UE 110B. In particular, the second UE 110B may employ the FMCW waveform when transmitting (step 1118) the SL communication. The first UE 110A may then carry out passive sensing (step 1122) by receiving and processing reflections of the FMCW waveform transmitted, by the second UE 110B, in step 1118. As a result of carrying out (step 1122) the SL-based, bi-static, dedicated passive sensing, the first UE 110A may obtain more accurate information about the target of interest.

It should be appreciated that all signaling may be a dynamic signaling, which can be changed from one indication to another. "All" signaling is a reference to ICS configuration indications (steps 410, 610, 710, 810,910, 1010BS, 1010UE, 1110BS, 1110UE), selected/suggested waveform indications (steps 414, 614, 714, 814, 914, 1014BS, 1014UE, 110BS, 1114UE) and waveform list indications (steps 406, 906, 1106). In this dynamic signaling case, all, or part of, the signaling may be signaled to the BS 170 using dynamic signaling like L1 signaling, e.g., through the known DCI information structure. Alternatively, all, or part of, the signaling may be accomplished using semi-static signaling, which is not changed very frequently. In this semi-static signaling case, all, or part of, the signaling may be signaled to the BS 170 using higher layer signaling, e.g., through RRC signaling or signaling that uses the MAC-CE.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    receiving, at a first communication device from a second communication device, a sensing capability report, wherein the sensing capability report indicates sensing capabilities of the second communication device, the sensing capabilities including at least one of:
        an indication of an amount of processing capability;
        an indication of an amount of radio frequency capability; and
        an indication of duplexing capability;
    transmitting, from the first communication device to the second communication device, first signaling for indicating an integrated communication and sensing (ICS) configuration, the ICS configuration including at least one of:
        a sensing-only ICS configuration;
        a sensing and communications ICS configuration; and
        a communications-only ICS configuration;
    selecting, based, at least in part, on the indicated ICS configuration and based, at least in part, on the sensing capability report, a waveform, thereby generating a selected waveform;
    transmitting, from the first communication device to the second communication device, second signaling for indicating the selected waveform;
    transmitting, by the first communication device, a signal according to the selected waveform.

2. The method of claim 1, wherein the first communication device is a base station and the second communication device is a user equipment (UE), wherein the method further comprises receiving, by the base station, a reflection of the signal.

3. The method of claim 1, wherein the first signaling is a semi-static signaling and the second signaling is a dynamic signaling.

4. A method comprising:
    communicating, from a first communication device to a second communication device, a sensing capability report, wherein the sensing capability report indicates sensing capabilities of the first communication device, the sensing capabilities including at least one of:
        an indication of an amount of processing capability;
        an indication of an amount of radio frequency capability; and
        an indication of duplexing capability;
    receiving, at the first communication device from the second communication device, first signaling indicating an integrated communication and sensing (ICS) configuration, the ICS configuration including at least one of:
        a sensing-only ICS configuration;
        a sensing and communications ICS configuration; and
        a communications-only ICS configuration;
    receiving, at the first communication device from the second communication device, second signaling indicating a selected waveform, the selected waveform selected, by the second communication device, based, at least in part, on the indicated ICS configuration and based, at least in part, on the sensing capabilities indicated in the sensing capability report; and
    receiving, by the first communication device, a signal according to the selected waveform.

5. The method of claim 4, wherein the first communication device is a user equipment (UE) and the second communication device is a base station, and wherein the signal received by the UE is a reflection of a transmitted signal.

6. The method of claim 4, wherein the first signaling is a semi-static signaling and the second signaling is a dynamic signaling.

7. A first device comprising:
    a memory storing instructions;
    a receiver;
    a transmitter; and
    a processor configured, by executing the instructions, to:
        receive, from a second device, a sensing capability report, wherein the sensing capability report indicates sensing capabilities of the second device, the sensing capabilities including at least one of:
            an indication of an amount of processing capability;
            an indication of an amount of radio frequency capability; and
            an indication of duplexing capability;

transmit, to the second device, first signaling for indicating an integrated communication and sensing (ICS) configuration, the ICS configuration including at least one of:
a sensing-only ICS configuration;
a sensing and communications ICS configuration; and
a communications-only ICS configuration;
select, based, at least in part, on the indicated ICS configuration and based, at least in part, on the sensing capability report, a waveform, thereby generating a selected waveform;
transmit, to the second device, second signaling indicating the selected waveform; and
transmit a signal according to the selected waveform.

8. The first device of claim 7, wherein the first device is a base station and the second device is a user equipment (UE), wherein the instructions further include instructions for the base station to receive a reflection of the signal.

9. The first device of claim 7, wherein the first signaling is a semi-static signaling and the second signaling is a dynamic signaling.

10. A first device comprising:
a memory storing instructions;
a receiver;
a transmitter; and
a processor configured, by executing the instructions, to:
communicate, to a second device, a sensing capability report, wherein the sensing capability report indicates sensing capabilities of the first device, the sensing capabilities including at least one of:
an indication of an amount of processing capability;
an indication of an amount of radio frequency capability; and
an indication of duplexing capability;
receive, from the second device, first signaling indicating an integrated communication and sensing (ICS) configuration, the ICS configuration including at least one of:
a sensing-only ICS configuration;
a sensing and communications ICS configuration; and
a communications-only ICS configuration;
receive, from the second device, second signaling indicating a selected waveform, the selected waveform selected, by the second device, based, at least in part, on the indicated ICS configuration and based, at least in part, on the sensing capabilities indicated in the sensing capability report; and
receive a signal according to the selected waveform.

11. The first device of claim 10, wherein the first device is a user equipment (UE) and the second device is a base station, wherein the signal received by the UE is a reflection of a transmitted signal.

12. The first device of claim 10, wherein the first signaling is a semi-static signaling and the second signaling is a dynamic signaling.

* * * * *